United States Patent
Chhabra (10) Patent No.: US 10,601,590 B1
(45) Date of Patent: Mar. 24, 2020

(54) SECURE SECRETS IN HARDWARE SECURITY MODULE FOR USE BY PROTECTED FUNCTION IN TRUSTED EXECUTION ENVIRONMENT

(71) Applicant: Amazon Technologies, Inc., Seattle, WA (US)

(72) Inventor: Jasmeet Chhabra, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 211 days.

(21) Appl. No.: 15/808,667

(22) Filed: Nov. 9, 2017

(51) Int. Cl.
 *G06F 21/44* (2013.01)
 *H04L 9/08* (2006.01)
 *H04L 9/32* (2006.01)

(52) U.S. Cl.
 CPC ............ *H04L 9/0897* (2013.01); *G06F 21/44* (2013.01); *H04L 9/3236* (2013.01)

(58) Field of Classification Search
 CPC ................................ G06F 21/105; G06F 21/44
 See application file for complete search history.

(56) References Cited

U.S. PATENT DOCUMENTS

| | | | | |
|---|---|---|---|---|
| 2001/0002485 A1* | 5/2001 | Bisbee | ................... | G06Q 20/00 713/167 |
| 2003/0115144 A1* | 6/2003 | Stefik | ..................... | G06F 21/10 705/51 |
| 2012/0079277 A1* | 3/2012 | Ng | ........................ | H04L 9/0822 713/171 |
| 2017/0019254 A1* | 1/2017 | Bone | ..................... | G06F 21/575 |

* cited by examiner

*Primary Examiner* — Ponnoreay Pich
(74) *Attorney, Agent, or Firm* — Lowenstein Sandler LLP (57) ABSTRACT

A computing device stores code associated with a computing function in a protected computing environment, such as a trusted execution environment, wherein the computing function is attested by a code measurement service associated with the protected computing environment. The computing device links the computing function to a secret stored in a hardware security module (HSM), the secret to enable execution of the computing function in the protected computing environment.

20 Claims, 8 Drawing Sheets

SECURE SECRETS IN HARDWARE SECURITY MODULE FOR USE BY PROTECTED FUNCTION IN TRUSTED EXECUTION ENVIRONMENT

BACKGROUND

Cloud computing defines a model for enabling ubiquitous, convenient, on-demand network access to a shared pool of configurable computing resources (e.g., networks, servers, storage, applications, services) that can be rapidly provisioned and released with minimal management effort or service provider interaction. Certain characteristics of the cloud computing model include on demand self-service, broad network access, resource pooling, rapid elasticity, and measured service. Cloud computing can include several service models, including Software as a Service (SaaS), Platform as a Service (PaaS), and Infrastructure as a Service (IaaS). The cloud computing model may be implemented according to one of the several deployment models, including private cloud, community cloud, public cloud, or hybrid cloud.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

Embodiments are described for securing secrets in a hardware security module (HSM) for use by a protected function in a trusted execution environment (TEE). An HSM can store secrets and keys for many purposes. An HSM is very well protected against hacking, tampering and physical attacks. But, typical application programming interfaces (APIs) for a cloud-based HSM only provide very limited functionality. Some TEEs also provide strong protection against malicious software, but are unable to prevent physical tampering, etc. Thus, there a number of use cases where even if an HSM is used for storage, there is only limited protection. To address these issues, in one embodiment, the security of an HSM is combined with the flexibility of TEE. This is potentially useful in many situations, including those outlined below.

In one example situation, a trusted service calling the HSM to access and use secrets may be compromised. This means that even if the secrets are in the HSM, the operations permitted by the HSM may be performed by an attacker impersonating an authorized entity. In another situation, the HSM or a hardware security appliance (HSA) may intentionally implement limited functionality to reduce the threat surface. The functionality may typically be limited to standard cryptographic operations. The code for the HSM or HSA goes through extensive reviews and penetration testing, making it potentially cost-prohibitive to implement custom extensions. Thus, in usage, some secrets (typically temporary or derived) are revealed to a service that is calling the HSM. Since complete signature authentication cannot be performed inside the HSM, for certain protocols, the primary secrets are revealed to the authentication endpoints. In addition, HSMs are costly to buy and maintain and cannot scale dynamically in a cloud computing system.

In other situations, it is beneficial for the encrypted data to only be used in a protected and verified piece of code. For example, a company's financial data may be encrypted with keys that are in the HSM at rest. When the data is decrypted, however, the data is used outside of the HSM. In an ideal world, the code processing the financial data would be able to directly run on the HSM. But, given the fixed functionality of the HSM modules this extension of the processing capability is not always possible.

To address the issues described above, in one embodiment, the system described herein combines the HSM and a TEE to provide the best security characteristics of both environments. In one embodiment, the system links secrets in the HSM to a trusted TEE attested code running in a cloud computing environment. In this manner, secrets can be stored in the HSM, while temporary secrets or derived secrets can be accessed by customized and attested TEE code. In an ephemeral code execution environment, this secret access is inherently temporary. Additional details are provided below with respect to FIGS. 1-8.

Figure 1:
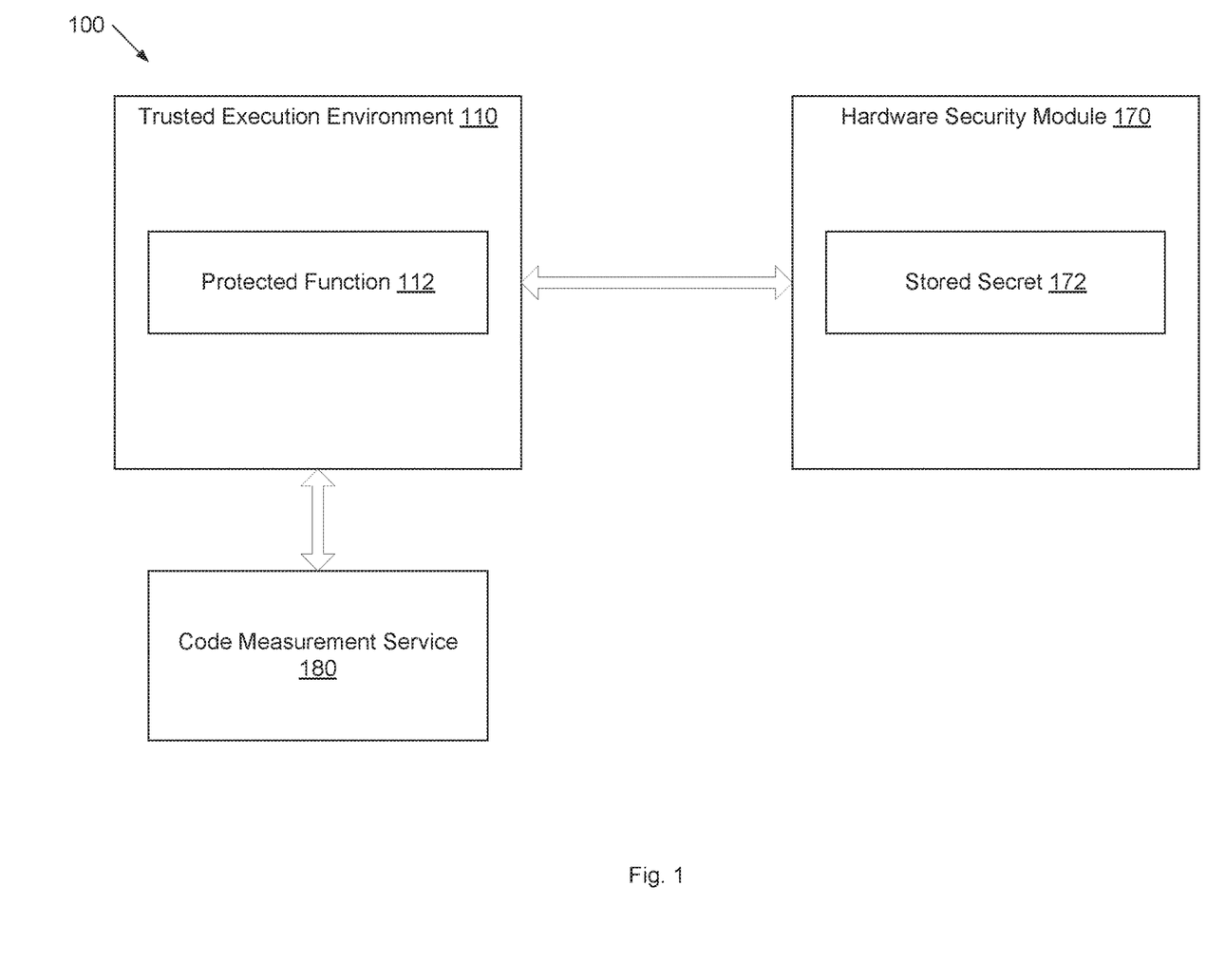
FIG. 1 is a block diagram illustrating a system for securing secrets in a hardware security module (HSM) for use by a protected function in a trusted execution environment (TEE), according to an embodiment.

FIG. 1 is a block diagram illustrating a system for securing secrets in a HSM for use by a protected function in a TEE, according to an embodiment. In one embodiment, the system 100 includes trusted execution environment (TEE) 110 and hardware security module (HSM) 170. TEE 110 may be a secure processing environment which protects code and data loaded inside with respect to confidentiality and integrity. The TEE 110 may include an isolated execution environment, such as a secure area of a processing device, which provides security features such as isolated execution, integrity of trusted applications along with confidentiality of their assets. In general terms, the TEE 110 offers an execution space that provides a higher level of security than a rich operating system and more functionality than a "secure element" (SE). Depending on the embodiment, TEE 110 can be used to protect digitally encoded information, provide secure processing for financial services, support biometric identification and authentication processes, and enable the secure handling of confidential or sensitive information.

In one embodiment, protected function 112 runs within TEE 110. Protected function 112 may include custom code written to provide corresponding functionality and stored in TEE 110 for protected execution. There may be any number of possible implementations of this, including but not limited to an embedded processor, a trusted hypervisor and virtual machine, trusted platform module, etc. In one embodiment, protected function 112 runs in TEE 110 and interacts with a stored secret 172 in HSM 170 to provide secure extensions to the capabilities of the HSM 170. By running in TEE 110, protected function 112 reduces cost by removing the need for customizations to go through the same level of extensive testing as typical HSM code and improves security for various cloud computing services, by not only protecting the permanent secrets (e.g., stored secret 172) stored by HSM 170, but also protecting the temporary or derived secrets in use by protected function 112. In addition, scaling custom HSM extensions in the TEE 110, such as protected function 112, is much cheaper than scaling HSMs themselves.

In one embodiment, HSM 170 may be a computing component that safeguards and manages digital keys for strong authentication and provides cryptoprocessing capabilities. HSM 170 may be embodied, for example, as a plug-in card or an external device that attaches directly to a computer or network server. HSM 170 may possess controls that provide tamper evidence such as logging and alerting and tamper resistance such as deleting keys upon tamper detection. HSM 170 may contain one or more secure cryptoprocessor chips to prevent tampering and bus probing. In one embodiment, HSM 170 includes a means to securely back up the keys it handles either in a wrapped form via the computer's operating system or externally using a smartcard or some other security token. HSM 170 may feature dual power supplies and field replaceable components such as cooling fans to conform to the high-availability requirements of data center environments and to enable business continuity.

In one embodiment, HSM 170 includes stored secret 172. Stored secret 172 may include, for example, cryptographic keys such as an Elliptic-curve Diffie-Hellman (ECDH) keypair, digital certificates, symmetric keys, or other arbitrary data. In one embodiment, protected function 112 may utilize stored secret 172 during execution in TEE 110. To authenticate protected function 112 and authorize the use of stored secret 172, TEE 110 may utilize code measurement service 180. There are many possible implementations of this code measurement, and the specifics may dependent on characteristics of the particular TEE 110. In one embodiment, code measurement service 180 takes a cryptographic hash of all the running code of protected function 112. The resulting hash is used as the measurement of the code. In one embodiment, an additional sealing service cryptographically binds some secret with the measurement of the protected function 112. This can be done in a manner such that the secret can only be revealed to the protected function 112 with the same measurement (i.e., hash). In one embodiment, the sealing service is part of code measurement service 180. In other embodiments, the sealing service is accessed separately. Additional details with respect to the interaction of TEE 110 and HSM 170 are provided below.

Figure 2:
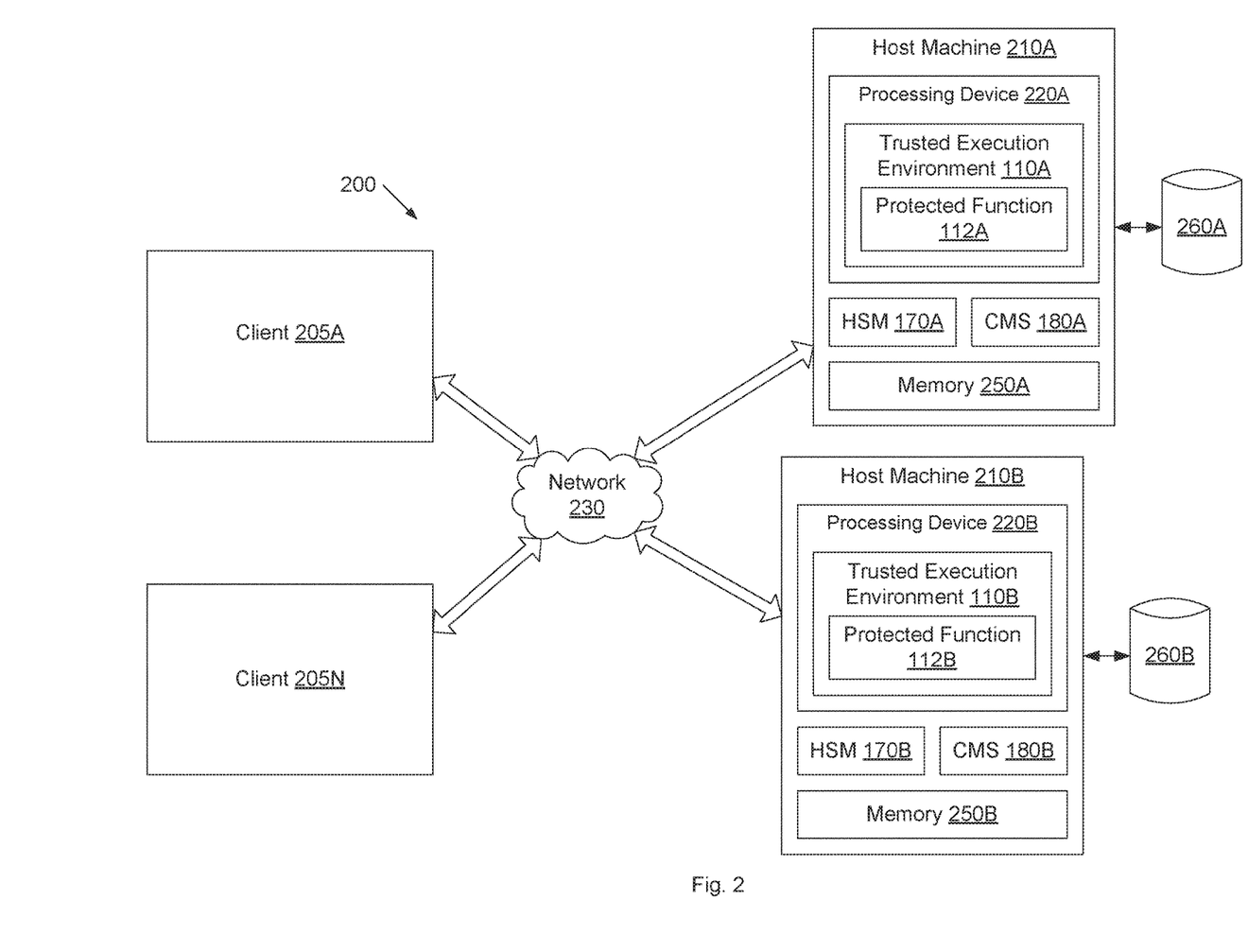
FIG. 2 is a block diagram of an exemplary network architecture, in which embodiments of the present disclosure may operate.

FIG. 2 is a block diagram of an exemplary network architecture 200, in which embodiments of the present disclosure may operate. In one embodiment, the network architecture 200 includes one or more cloud computing devices, such as host machines 210A-210B forming a computing cluster, which may be employed to provide cloud computing services to one or more clients, such as client devices 205A-205N. The client devices 205A-205N may communicate with host machines 210A-210B via one or more networks 230. Client devices 205A-205N are representative of any number of clients which may utilize host machines 210A-210B for storing and accessing data in network architecture 200. Client devices 205A-205N are representative of any number of stationary or mobile computers such as desktop personal computers (PCs), servers, server farms, workstations, laptops, handheld computers, servers, personal digital assistants (PDAs), smart phones, game consoles and so forth. It is noted that some systems may include only a single client device, connected directly or remotely, to host machines 210A-210B.

In alternative embodiments, the number and type of client devices, host machines, and data storage devices is not limited to those shown in FIG. 2. At various times one or more clients may operate offline. In addition, during operation, individual client device connection types may change as users connect, disconnect, and reconnect to network architecture 200. Further, the systems and methods described herein may be applied to directly attached computing systems or network attached computing systems and may include a host operating system configured to perform one or more aspects of the described methods. Numerous such alternatives are possible and are contemplated.

In one embodiment, network 230 may utilize a variety of techniques including wireless connections, direct local area network (LAN) connections, wide area network (WAN) connections such as the Internet, a router, storage area network, Ethernet, and others. Network 230 may comprise one or more LANs that may also be wireless. Network 230 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 230. The network 230 may interface with a set of communications protocols used for the Internet such as the Transmission Control Protocol (TCP) and the Internet Protocol (IP), or TCP/IP.

In one embodiment, each host machine 210A-210B may be associated with one or more data storage devices 260A-260B. Examples of data storage devices include solid-state drives (SSDs), flash memory, magnetic or optical disks, tape drives, RAID arrays, EEPROM devices, storage area networks, network-attached storage, and/or any other devices capable of storing data.

Host machines 210A-210B may each include one or more processing devices 220A-220B, each comprising one or more processor cores. Each processor core includes circuitry for executing instructions according to a predefined general-purpose instruction set. The processor cores may access cache memory subsystems for data and computer program instructions. The cache subsystems may be coupled to a memory hierarchy comprising random access memory (RAM) 250A-250B and a storage device 260A-260B.

In one embodiment, each of processing devices 220A-220B includes a corresponding TEE 110A-110B executing an associated protected function 112A-112B. In addition, each of host machines 210A-210B may include an HSM 170A-170B and a code measurement service (CMS) 180A-180B. In one embodiment, protected function 112A-112B runs in TEE 110A-110B to expand upon the capabilities of the connected HSM 170A-170B. In one embodiment, protected function 112A-112B is attested, and later authenticated, by code measurement service 180A-180B in such a way that protected function 112A-112B can be trusted to receive stored secret 172 from HSM and use that secret during execution. In one embodiment, protected function 112A-112B is attested by code measurement service 180A-180B via a cryptographic hash of the function code and then can be granted authentication credentials by the HSM 170A-

170B. The authentication credentials can be stored with the code measurement service 180A-180B and can be retrieved later by protected function 112A-112B during invocation, if the code measurement is successful, and used for retrieving the stored secret 172 from HSM 170A-170B when the protected function 112A-112B is invoked.

In one embodiment, TEE 110A-110B and HSM 170A-170B may be located on separate physical machines connected over network 230 or other connection. In another embodiment, TEE 110A-110B and HSM 170A-170B may be located in a local computing environment on a single physical machine or set of physical machines that are directly connected or connected over a local network connection, rather than executing in a cloud computing environment, as illustrated in FIG. 2.

Figure 3:
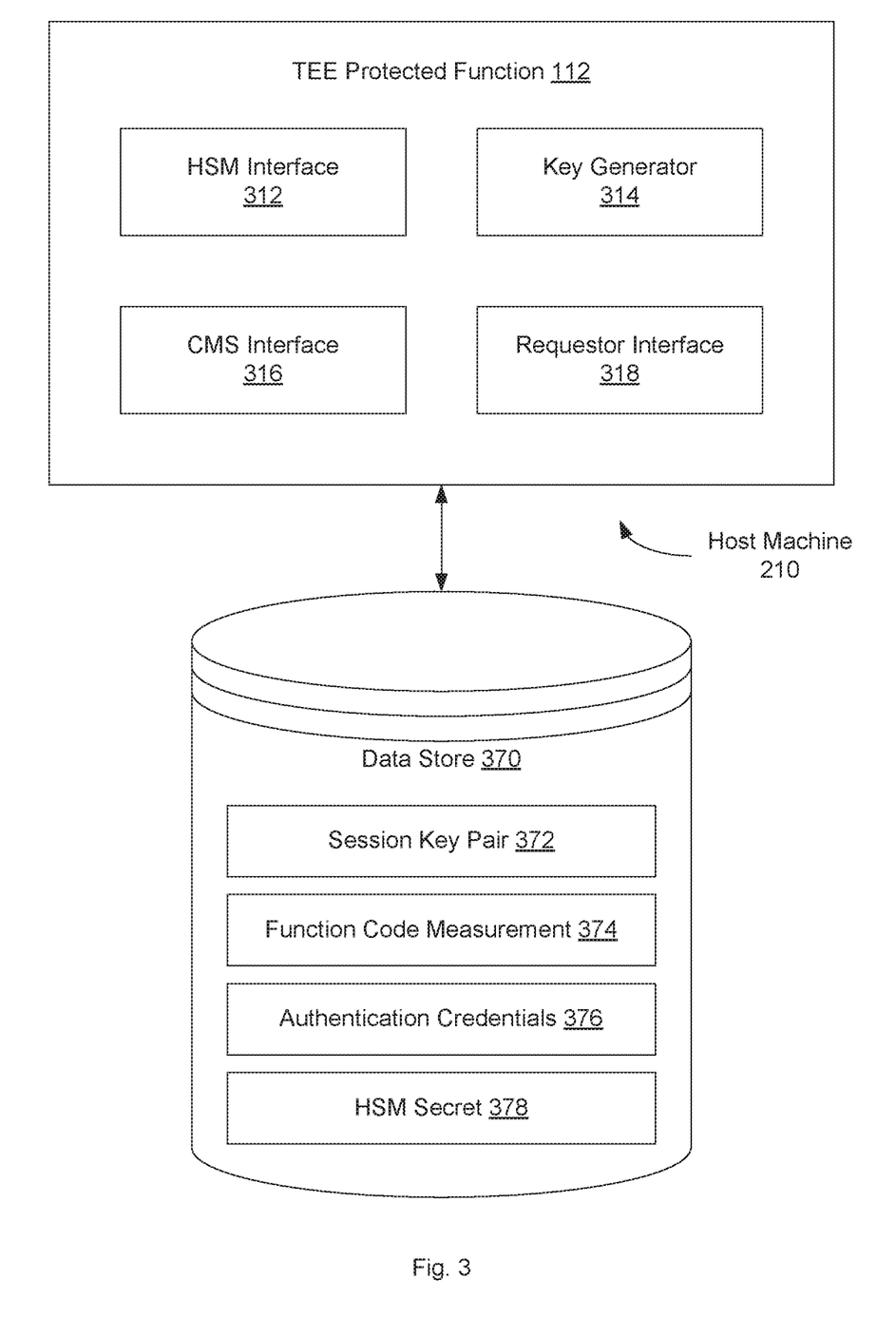
FIG. 3 is a block diagram illustrating a TEE protected function, according to an embodiment.

FIG. 3 is a block diagram illustrating a TEE protected function 112, according to an embodiment. In one embodiment, TEE protected function 112 includes HSM interface 312, key generator 314, code measurement service (CMS) interface 316, and requestor interface 318. This arrangement of modules and components may be a logical separation, and in other embodiments, these modules or other components can be combined together or separated in further components, according to a particular implementation. In one embodiment, data store 370 is connected to TEE protected function 112 and includes session key-pair 372, function code measurement 374, authentication credentials 376, and HSM secret 378. In one implementation, one physical node (e.g., host machine 210) may include both TEE protected function 112 and data store 370. In another embodiment, data store 370 may be external to the physical node and may be connected over a network or other connection. In other implementations, the physical node and TEE protected function 112 may include different and/or additional components and applications which are not shown to simplify the description. Data store 370 may be embodied on one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one embodiment, HSM interface 312 manages interactions between protected function 112 and HSM 170 (i.e., HSM 170A-170B). As part of the operations associated with setting up and invoking protected function 112 in TEE 110, protected function 112 may communicate with HSM 170 and HSM interface 312 may facilitate these communications. For example, HSM interface 312 may receive an attestation instruction from HSM 170, send an attestation result to the HSM 170 with a request to establish a secure communication session, receive authentication credentials 376 generated by the HSM 170 according to a session secret, provide the authentication credentials 376 back to HSM 170 with a request for a secret 378 stored by the HSM 170, and/or receive the secret 378 from the HSM 170.

In one embodiment, key generator 314 generates a session key-pair 372 comprising a session private key and a session public key. In one embodiment, session key-pair 372 includes an ECDH key-pair, although other types of cryptographic keys may be used in other embodiments. The session key-pair 372 allows two parties, each having an elliptic-curve public-private key pair, establish a shared secret over an insecure channel. This shared secret may be directly used as a key, or to derive another key. Elle key, or the derived key, can then be used to encrypt subsequent communications using a symmetric-key cipher.

In one embodiment, CMS interface 316 manages interactions between protected function 112 and CMS 180 (i.e., CMS 180A-180B). As part of the operations associated with attesting and authenticating protected function 112 in TEE 110, protected function 112 may communicate with CMS 180 and CMS interface 316 may facilitate these communications. For example, CMS interface 316 may send an attestation request comprising a session public key to CMS 180, receive an attestation result comprising a function code measurement 374 corresponding to the code associated with the protected function 112 from CMS 180, provide authentication credentials 376 to the CMS 180 for storage, receive a confirmation that the authentication credentials 376 were stored with CMS 180, request authentication of protected function 112 from CMS 180, and/or receive authentication credentials 376 responsive to CMS 180 authenticating the protected function 112.

In one embodiment, requestor interface 318 manages interactions between protected function 112 and requestor (e.g., one of client devices 205A-205N). As part of the operations associated with invoking protected function 112 in TEE 110, protected function 112 may communicate with a requestor and requestor interface 318 may facilitate these communications. For example, requestor interface 318 may receive an invocation command requesting execution of the protected function 112 in the TEE 110 and/or provide a result of the execution of the protected function 112 in the TEE 110 to the requestor.

Figure 4:
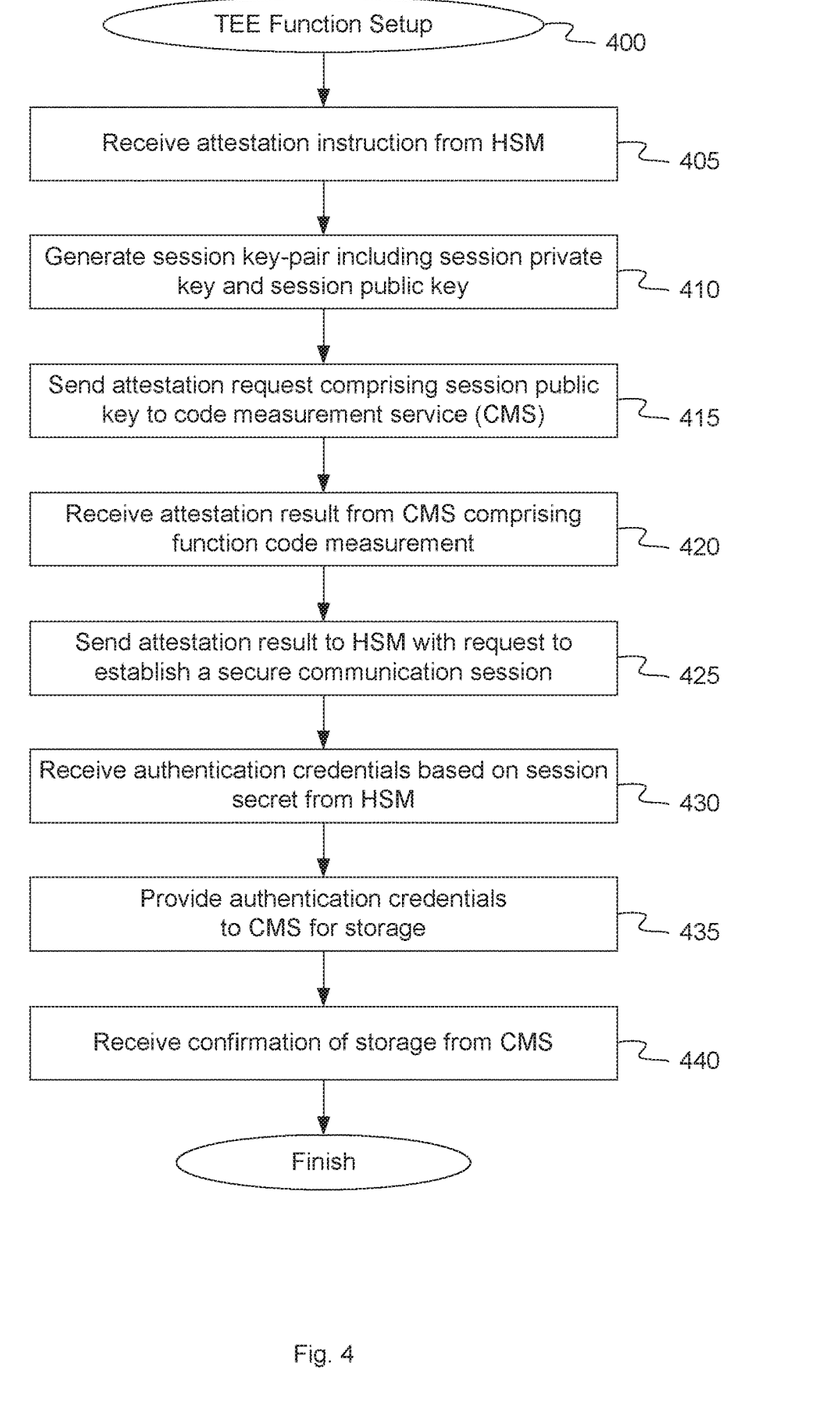
FIG. 4 is a flow diagram illustrating method of setting up a TEE protected function, according to an embodiment.

FIG. 4 is a flow diagram illustrating method of setting up a TEE protected function, according to an embodiment. The method 400 may be performed by processing logic that comprises hardware (e.g., circuitry, dedicated logic, programmable logic, microcode, etc.), software, firmware, or a combination thereof. In one embodiment, method 400 may be performed by TEE protected function 112, as shown in FIGS. 1-3.

Referring to FIG. 4, at block 405, method 400 receives an attestation instruction from HSM 170. In one embodiment, the attestation instruction is delivered to protected function 112 at a URL specified by a system administrator and causes the protected function 112 to prove its identity by initiating an attestation process with code measurement service 180.

At block 410, method 400 generates a session key-pair 372 comprising a session private key and a session public key. In one embodiment, key generator 314 generates a session key-pair 372 comprising a session private key and a session public key. In one embodiment, session key-pair 372 includes an ECDH key-pair or other type of cryptographic keys.

At blocks 415-420, method 400 requests attestation of the code associated with the protected function 112 by a code measurement service 180 to obtain attested code. At block 415, method 400 sends an attestation request comprising the session public key to the code measurement service 180. In one embodiment, CMS interface 316 generates the attestation request and sends the session public key to code measurement service 180.

At block 420, method 400 receives an attestation result comprising a function code measurement 374 corresponding to the code associated with the protected function 112 from the code measurement service 180. In one embodiment, code measurement service 180 performs an operation (e.g., applies a cryptographic hash) on the code associated with the protected function 112 to generate a function code measurement, and an attestation service signs the function code measurement and associated session keys to attest that they are coming from TEE function 112 having the measurement included in the attestation request. In one embodiment, CMS interface 316 receives the attestation result and stores function code measurement 374 in data store 370.

At block 425-430, method 400 acquires authentication credentials 376 for the attested code from HSM 170. At block 425, method 400 sends the attestation result to the HSM 170 with a request to establish a secure communication session. As described above, the attestation result may include the session public key from session key pair 372 and the signed function code measurement 374.

At block 430, method 400 receives authentication credentials 376 generated by the HSM 170 according to a session secret. In one embodiment, HSM 170 generates a session secret by applying a key derivation function utilizing a private key of a generated session ECDH key-pair and a public key from TEE function 112 and generates authentication credentials based on the session secret. TEE function 112 can use the authentication credentials to identify itself later on for access to the secret stored by HSM 170 when TEE function 112 is invoked. In one embodiment, HSM interface 312 receives the authentication credentials 376 and stores them in data store 370.

At block 435, method 400 provides authentication credentials 376 to the code measurement service 180 for storage, and at block 440, method 400 receives a confirmation that the authentication credentials 376 were stored with the code measurement service 180. Upon proving its identify via the code measurement at a later time when invoked, protected function 112 can retrieve the stored credentials use them to access the stored secret of HSM 170 for use during execution.

Figure 5:
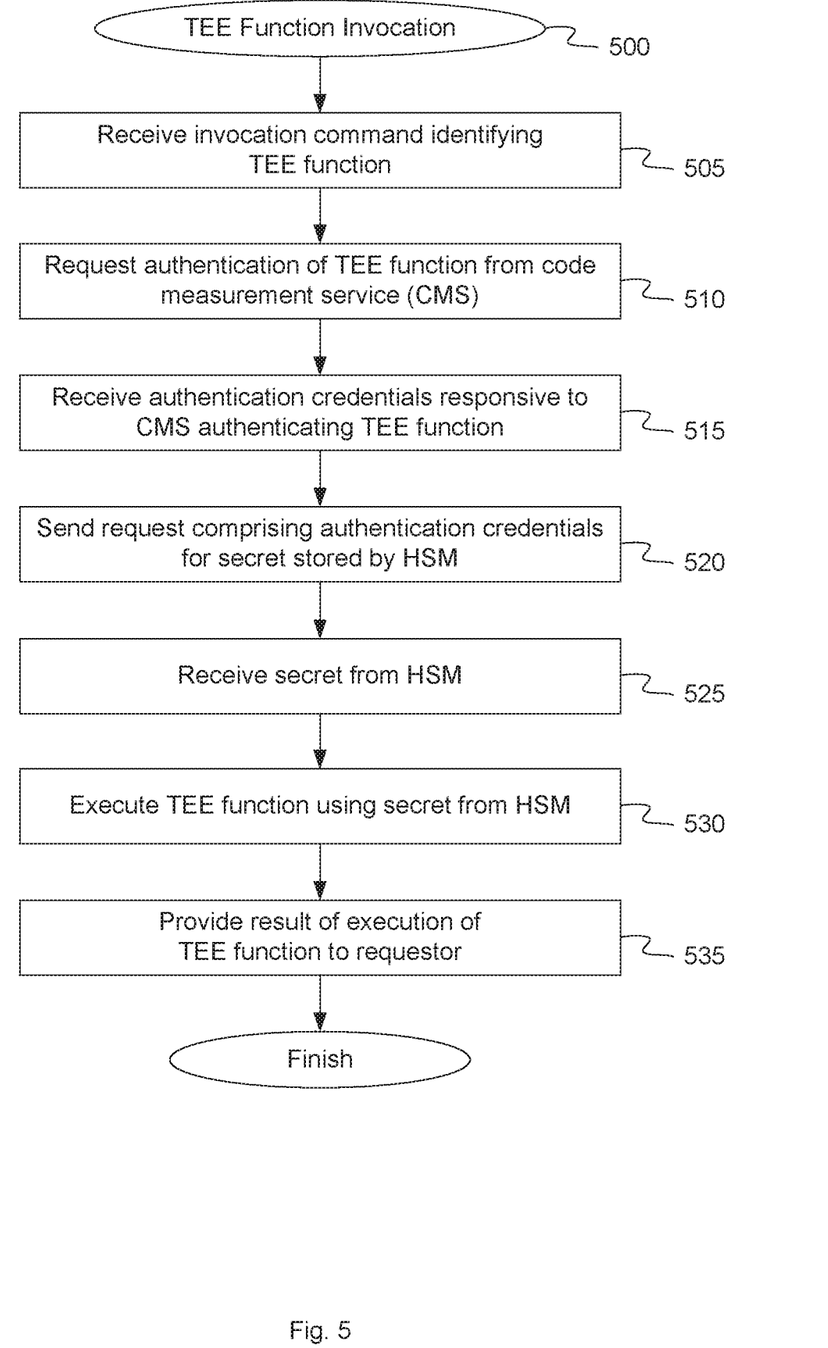
FIG. 5 is a flow diagram illustrating method of invoking a TEE protected function, according to an embodiment.

FIG. 5 is a flow diagram illustrating method of invoking a TEE protected function, according to an embodiment. The method 500 may be performed by processing logic that comprises hardware (e.g., circuitry, dedicated logic, programmable logic, microcode, etc.), software, firmware, or a combination thereof. In one embodiment, method 500 may be performed by TEE protected function 112, as shown in FIGS. 1-3.

Referring to FIG. 5, at block 505, method 500 receives an invocation command requesting execution of the protected function 112 in the TEE 110. In one embodiment, requestor interface 318 receives the invocation command from a user, system administrator, or other application running on one of host machines 210A-210B.

At blocks 510-515, method 500 obtains authentication credentials 376 for a protected function 112 running in the TEE 110 from a code measurement service 180. At block 510, method 500 requests authentication of the protected function 112 running in the TEE 110 from a code measurement service 180. In one embodiment, CMS interface 316 generates and sends an authentication request 704 to code measurement service 180.

At block 515, method 500 receives authentication credentials 376 responsive to the code measurement service 180 authenticating the protected function 112. In one embodiment, code measurement service 180 applies a cryptographic hash to code associated with the protected function 112 to generate a code measurement and compares the code measurement to a stored code measurement. Responsive to the code measurement matching the stored code measurement, code measurement service 180 unseals the stored authentication credentials, and CMS interface 316 receives the authentication credentials from code measurement service 180.

At block 520, method 500 provides the authentication credentials 376 to HSM 170 with a request for a secret 378 stored by the HSM 170. In one embodiment, HSM interface 312 generates the request for the stored secret and transmits the authentication credentials along with the request to HSM 170 to verify the identity of protected function 112. If HSM 170 is able to successfully verify the authentication credentials, at block 525, method 500 receives the secret 378 from the HSM 170. In one embodiment, the secret 378 may include a digital key used in the execution of protected function 112.

At block 530, method 500 executes the protected function 112 in the TEE 110 using the secret 378 from the HSM 170. As discussed above, protected function 112 may include custom code designed to extend the functionality of HSM 170. As a result, the operations performed during execution of protected function 112 are not limited in any way. At block 535, method 500 provides a result of the execution of the protected function 112 in the TEE 110 to a requestor.

Figure 6:
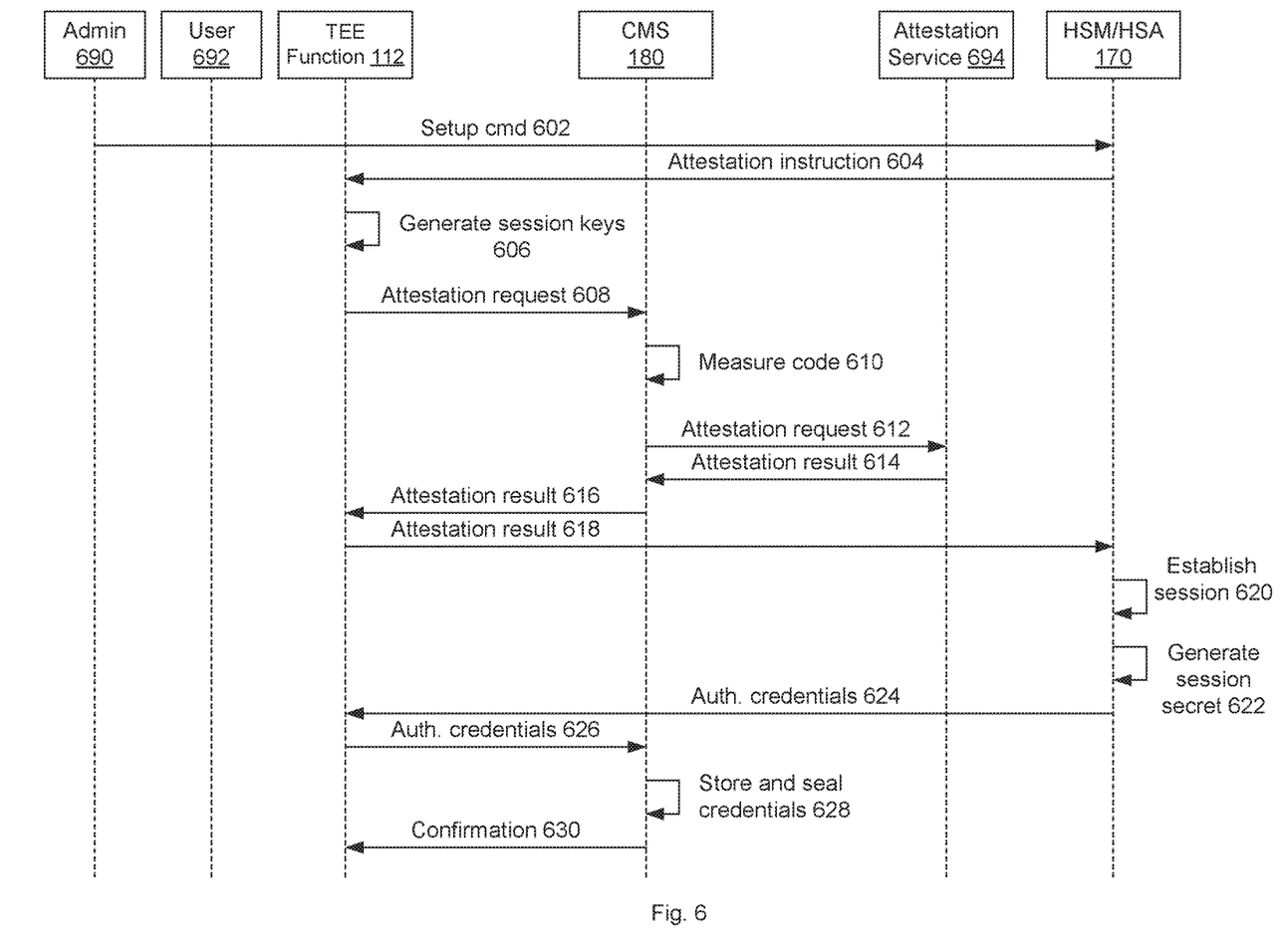
FIG. 6 is a sequence diagram illustrating setting up a TEE protected function, according to an embodiment

FIG. 6 is a sequence diagram illustrating setting up a TEE protected function, according to an embodiment. At 602, a system administrator 690, or another party, sends a setup command to HSM 170 including a uniform resource locator (URL) or other identifier of a TEE protected function 112 to be linked with the HSM 170. The setup command indicates to the HSM 170 that it can reveal a stored secret 172 to a calling party at the URL having a particular function measurement. At 604, HSM 170 sends at attestation instruction to the TEE function 112 at the URL to cause the TEE function 112 to prove its identity. At 606, TEE function 112 generates a session key-pair 372 comprising a session private key and a session public key. At 608, TEE function 112 sends an attestation request comprising the session public key to the code measurement service 180. At 610, code measurement service 180 performs an operation on the code associated with the protected function 112 to generate the function code measurement. In one embodiment, code measurement service 180 applies a cryptographic hash to the code in order to generate the measurement. At 612, code measurement service 180 sends an attestation request including the session public key and the function code measurement to attestation service 694. Attestation service 694 signs the function code measurement and associated session keys to attest that they are coming from TEE function 112 having the measurement included in the attestation request. At 614, attestation service 694 provides the attestation result to code measurement service 180 and at 616, code measurement service 180 forwards the attestation result to TEE function 112.

At 618, TEE function 112 sends the attestation result to HSM 170 with a request to establish a secure communication session. At 620, HSM 170 establishes a secure session including generating a session ECDH key-pair, and at block 622, HSM 170 generates a session secret, for example, by applying a key derivation function utilizing the private key of the session ECDH key-pair and the public key from TEE function 112. At 624, HSM 170 provides authentication credentials to TEE function 112 based on the session secret. TEE function 112 can use the authentication credentials to identify itself later on for access to the secret stored by HSM 170 when TEE function 112 is invoked. At 626, TEE function 112 provides the authentication credentials to the code measurement service 180 for storage. At 628, code measurement service 180 stores and seals the authentication credentials so that they can only be accessed by TEE function 112 later at an invocation time. At 630, code measurement service 180 provides a confirmation to TEE function 112 that the authentication credentials were successfully stored.

Figure 7:
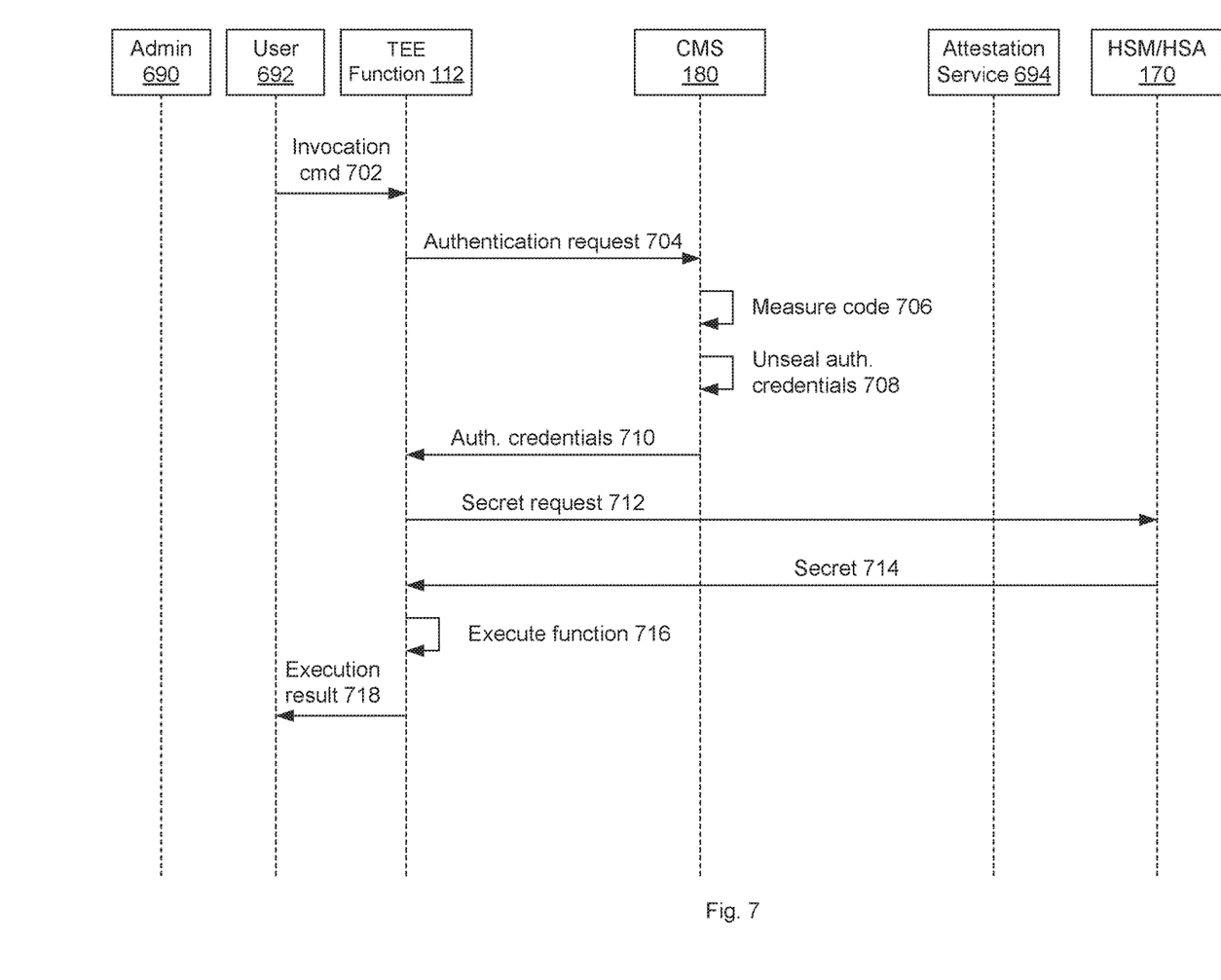
FIG. 7 is a sequence diagram illustrating invoking a TEE protected function, according to an embodiment.

FIG. 7 is a sequence diagram illustrating invoking a TEE protected function, according to an embodiment. At 702, TEE function 112 receives an invocation command requesting execution of the TEE function 112 in the TEE 110 from a requestor (e.g., user 692). At 704, TEE function 112 requests authentication of the TEE function 112 running in the TEE 110 from code measurement service 180. At 706, code measurement service 180 performs an operation (e.g., applies a cryptographic hash) on code associated with the TEE function 112 to generate a code measurement and compares the code measurement to a stored code measurement. Responsive to the code measurement matching the stored code measurement, at 708, code measurement service 180 unseals the stored authentication credentials. At 710, code measurement service 180 provides the authentication credentials to TEE function 112. At 712, TEE function 112 provides the authentication credentials to HSM 170 with a request for a secret stored by the HSM 170. At 714, HSM 170 verifies the authentication credentials and provides the secret to TEE function 112. At 716, TEE 110 executes the TEE function 112 using the secret from the HSM 170, and at 718 TEE function 112 provides a result of the execution of the protected function 112 in the TEE 110 to a requestor 692.

Figure 8:
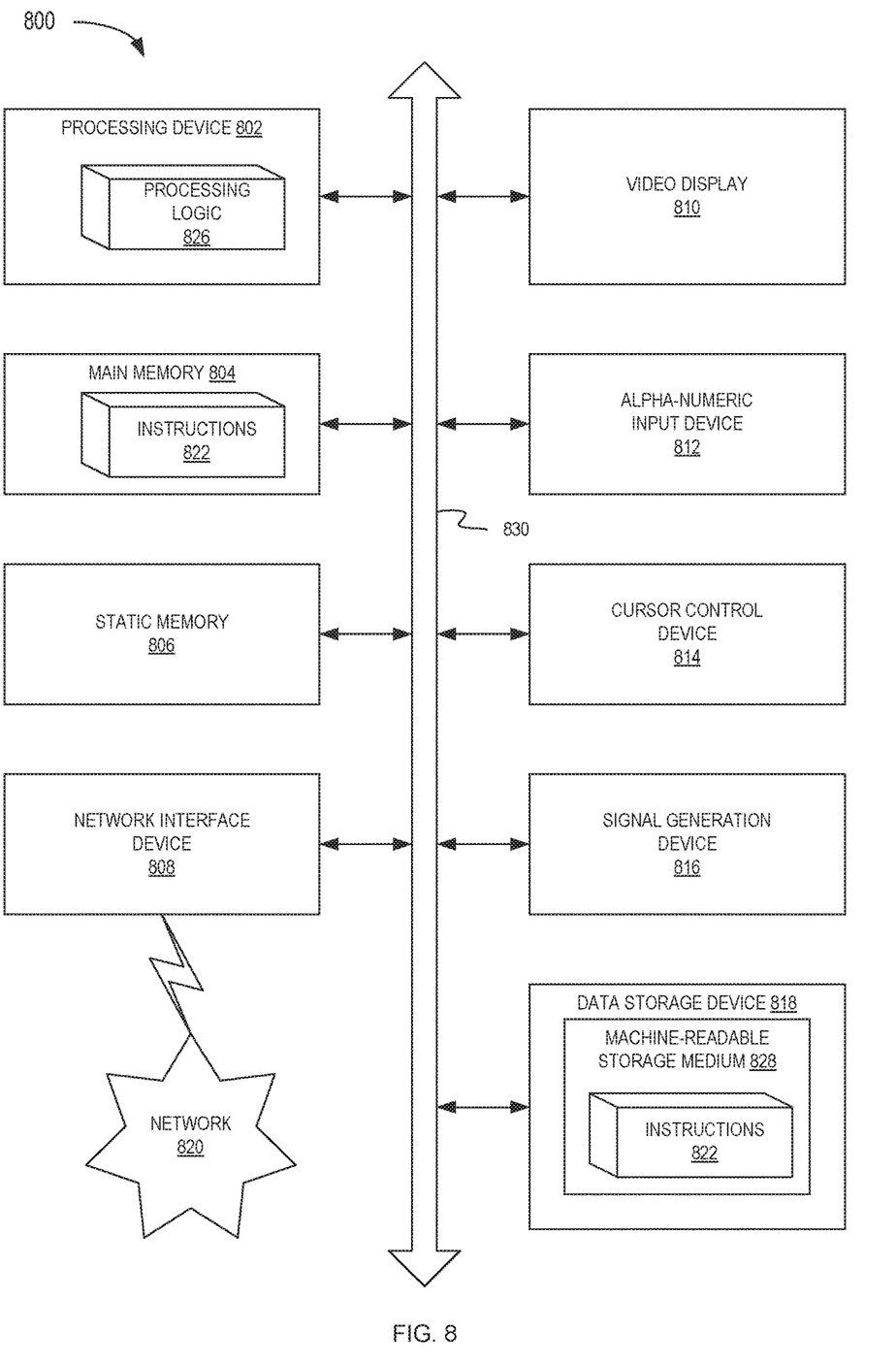
FIG. 8 is a block diagram illustrating one embodiment of a computer system, according to an embodiment.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a game console, a web appliance, a server, a host machine, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 800 may be representative of a computing device, such as host machines 210A-210B or client devices 205A-205N.

The exemplary computer system 800 includes a processing device 802, a main memory 804 (e.g., read-only memory (ROM), flash memory, dynamic random access memory (DRAM) (such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute processing logic 826 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-accessible storage medium 828, on which is stored one or more set of instructions 822 (e.g., software) embodying any one or more of the methodologies of functions described herein. The instructions 822 may also reside, completely or at least partially, within the main memory 804 and/or within the processing device 802 during execution thereof by the computer system 800; the main memory 804 and the processing device 802 also constituting machine-accessible storage media. The instructions 822 may further be transmitted or received over a network 820 via the network interface device 808.

The machine-readable storage medium 828 may also be used to store instructions for securing secrets in a hardware security module (HSM) for use by a protected function in a trusted execution environment (TEE), as described herein. While the machine-readable storage medium 828 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   storing, by one or more processors, code associated with a protected function in a trusted execution environment (TEE);
   requesting attestation of the code associated with the protected function by a code measurement service to obtain attested code;
   acquiring authentication credentials for the attested code from a hardware security module (HSM), and
   storing the authentication credentials with the code measurement service, the attested code to retrieve the authentication credentials when invoked and provide the authentication credentials to the HSM to obtain a secret stored in the HSM to enable execution of the protected function in the TEE.

2. The method of claim 1, further comprising:
   receiving an attestation instruction from the HSM; and
   generating a session key-pair comprising a session private key and a session public key.

3. The method of claim 2, wherein requesting attestation of the code associated with the protected function comprises:
   sending an attestation request comprising the session public key to the code measurement service; and
   receiving an attestation result comprising a function code measurement corresponding to the code associated with the protected function from the code measurement service.

4. The method of claim 3, wherein to generate the attestation result, the code measurement service to perform an operation on the code associated with the protected function to generate the function code measurement.

5. The method of claim 4, wherein to perform the operation on the code, the code measurement service to applies a cryptographic hash to the code.

6. The method of claim 3, wherein acquiring the authentication credentials for the attested code comprises:
   sending the attestation result to the HSM with a request to establish a secure communication session; and
   receiving the authentication credentials generated by the HSM according to a session secret.

7. The method of claim 1, further comprising:
   receiving a confirmation that the authentication credentials were stored with the code measurement service.

8. A computing device comprising:
   one or more processors; and
   memory to store computer-executable instructions that, if executed, cause the one or more processors to:
   store code associated with a computing function in a protected computing environment, wherein the computing function is attested by a code measurement service associated with the protected computing environment; and
   link the computing function to a secret stored in a hardware security module (HSM), the secret to enable execution of the computing function in the protected computing environment.

9. The computing device of claim 8, wherein the instructions further cause the one or more processors to:
   receive an attestation instruction from the HSM; and
   generate a session key-pair comprising a session private key and a session public key.

10. The computing device of claim 9, wherein the instructions further cause the one or more processors to:
    send an attestation request comprising the session public key to the code measurement service; and receive an attestation result comprising a function code measurement corresponding to the code associated with the computing function from the code measurement service.

11. The computing device of claim 10, wherein to generate the attestation result, the code measurement service to perform an operation on the code associated with the protected function to generate the function code measurement.

12. The computing device of claim 11, wherein to perform the operation on the code, the code measurement service applies a cryptographic hash to the code.

13. The computing device of claim 10, wherein to link the computing function to the secret stored in the HSM, the instructions to cause the one or more processors to:
    send the attestation result to the HSM with a request to establish a secure communication session; and
    receive authentication credentials generated by the HSM according to a session secret.

14. The computing device of claim 13, wherein the instructions further cause the one or more processors to:
    store the authentication credentials with the code measurement service; and
    receive a confirmation that the authentication credentials were stored with the code measurement service.

15. One or more non-transitory machine-readable storage mediums having stored therein instructions which, if performed by one or more processors, cause the one or more processors to:
    obtain authentication credentials for a protected function running in a trusted execution environment (TEE) from a code measurement service;
    provide the authentication credentials to a hardware security module (HSM) with a request for a secret stored by the HSM;
    receive the secret from the HSM; and
    execute the protected function in the TEE using the secret from the HSM.

16. The one or more non-transitory machine-readable storage mediums of claim 15, wherein the instructions further cause the one or more processors to:
    receive an invocation command requesting execution of the protected function in the TEE.

17. The one or more non-transitory machine-readable storage mediums of claim 15, wherein to obtain the authentication credentials, the instructions to cause the one or more processors to:
    request authentication of the protected function running in the TEE from a code measurement service; and
    receive authentication credentials responsive to the code measurement service authenticating the protected function.

18. The one or more non-transitory machine-readable storage mediums of claim 17, wherein to authenticate the protected function, the code measurement service to:
    perform an operation on code associated with the protected function to generate a code measurement;
    compare the code measurement to a stored code measurement; and
    responsive to the code measurement matching the stored code measurement, unseal the authentication credentials.

19. The one or more non-transitory machine-readable storage mediums of claim 18, wherein to perform the operation on code associated with the protected function to generate a code measurement, the code measurement service to apply a cryptographic hash to the code.

20. The one or more non-transitory machine-readable storage mediums of claim 15, wherein the instructions further cause the one or more processors to:
    provide a result of the execution of the protected function in the TEE to a requestor.

* * * * *